Sept. 10, 1968   M. P. GAGLIARDI ET AL   3,400,658
METHOD OF INTAGLIO PRINTING
Filed April 20, 1965

United States Patent Office 3,400,658
Patented Sept. 10, 1968

3,400,658
METHOD OF INTAGLIO PRINTING
Mario P. Gagliardi, Wayne, Arthur J. Dunne, River Edge, and Arthur R. Heuser, Mahwah, N.J., and James W. Healy, Wakefield, Mass., assignors, by direct and mesne assignments, to Interchemical Corporation, New York, N.Y., a corporation of Ohio
Filed Apr. 20, 1965, Ser. No. 449,594
5 Claims. (Cl. 101—170)

ABSTRACT OF THE DISCLOSURE

A process of intaglio printing with a foamed print paste having a density of 0.1 to 0.9 gram per cc., the paste having a residence time of .01 to 30 seconds in an enclosed feeding device, the ink being continuously removed from the feeding device, refoamed, and recirculated. The pressure in the feeding device is maintained at a pressure of 5 to 30 p.s.i. gauge. The foamed print paste can contain an aliphatic chlorofluorocarbon gas having a vapor pressure of 15 to 100 p.s.i. gauge at 100° F.

---

The invention relates to intaglio printing, that is printing which uses an engraved or gravure printing cylinder. More particularly, the present invention relates to a novel process of gravure printing using foamed ink.

The present method of gravure printing may be considered to be an improvement over the method of gravure printing with foamed inks set forth in U.S. Patent No. 2,971,458, Kumins et al.

In general, gravure printing with foamed ink has several advantages. It eliminates solvents which tend to cause fire, explosion and toxicity hazards in favor of a water-based ink. Because of the incorporated gases, drying times are substantially reduced. Also, the use of incorporated gases is diluents in place of solvents substantially reduces the cost of the inks. The foamed inks display a lower penetration into substrate stocks such as paper thereby requiring less pigment for equivalent color yield. Because of the reduction in pigment concentration for equivalent color yield, better gloss and rub resistance properties are made possible.

While the process of foamed printing described in the patent has been highly satisfactory for printing an textiles, it has been much less than satisfactory in reproducing fine detail and half tones required in most gravure printing operations on paper substrates. The primary shortcoming of the process of the patent resides in the inability to fully and uniformly fill the finer cells of the gravure plate with the foamed ink. This results in "washed-out" prints with many of the lighter half-tone areas appearing to be white.

We have found that one of the primary factors in the inability of the foamed ink in the process of the patent to fill the finer cells of a gravure cylinder plate is that after a given length of time, the distribution of the gas in the foamed ink becomes very non-uniform. The dispersed gas bubbles tend to merge producing larger and larger bubbles. The large bubbles result in voids of unfilled cylinder cells. We have found that by maintaining the ink in the foamed state for a very short period of time, the foamed ink remains quite uniform and free from appreciable bubble merger.

Accordingly, in its broadest aspect our invention involves a process of intaglio printing comprising applying a foamed print paste having a density in grams per cc. between 0.1 and 0.9 to the engravings of an intaglio printing cylinder, said print past being maintained for a residence time of from .01 to 30 seconds in an enclosed feeding device which excludes air from contact with the print paste in the vicinity of its contact with the engraved cylinder and said paste being continuously removed from the enclosed feeding device, refoamed and recirculated to said enclosed feeding device, and then contacting the printing cylinder engravings with the substrate to be printed upon to transfer the print paste from the engravings to the substrate. Because of the relatively short time that the foamed printing paste or ink remains in the foamed state, the refoaming and recirculation step is required.

Like the foamed inks described in U.S. Patent 2,971,458, the foamed inks of this invention in general preferably contain an incorporated gas, coloring material, water and may also contain thickening agents, emulsifiers and foam stabilizers.

In fact, any of the formulations set forth in said patent for textile printing may be used in the printing process of this invention if the viscosities are lowered to conventional viscosities for gravure printing on paper webs.

The coloring material may be dissolved or dispersed in the liquid phase, and may be a dye, a pigment, dyestuff intermediates which are converted to color after application, or a mixture of two or more of these. Suitable pigments include all the well known types of textile printing pigments, including metallic pigments, inorganic pigments, organic pigments, the pigments mentioned in said patent as well as the conventional pigments used in gravure printing on paper substrates.

Among suitable thickening agents are gum arabic, gum tragacanth, methyl cellulose, hydroxyethyl cellulose, polyvinyl alcohol, alginic acid and its salts, polyacrylates, starch, and polymeric polycarboxylic acids and salts thereof. One suitable thickener is the ammonium salt of a product known as Goodrite Carbopol K-934, sold by B. F. Goodrich Chemical Co. and reported to be a copolymer of 100 parts acrylic acid with 1 to 2 parts of allyl sucrose.

Suitable emulsifiers include ammonium and potassium salts of $C_{12}$–$C_{18}$ saturated and unsaturated aliphatic monocarboxylic acids, alkali and ammonium salts of sulfated $C_{10}$–$C_{24}$ paraffin hydrocarbons, sulfonated long-chain alkyl aromatic hydrocarbons, sulfated water-insoluble oxyethylated higher alkyl phenols, water-soluble oxyalkylated higher alkylphenols and the like. Also suitable, though in general less preferred, are the cationic surface active agents typified by cetyl pyridinium chloride, lauryl trimethyl ammonium bromide, tetradecyl morpholinium bromide, and long-chain alkyl amine oxides.

Other emulsifiers usable in compounding suitable foamable bases for use in this invention include the alkali, ammonium, and amine salts of higher alkenyl succinic acids, di-higher alkyl sulfosuccinates, and the various condensation products, well-known in the art but of complex structures, prepared by interaction of fatty acids or esters with primary or secondary alkanolamines.

Suitable foam stabilizers include the higher fatty alcohols such as decyl alcohol, lauryl and stearyl alcohol, the higher alkyl mono-ethers of ethylene glycol, diethylene glycol propylene glycol, and dipropylene glycol (such as ethyl diethylene glycol ether), fatty monoglycerides such as glycerol monolaurate and glycerol monostearate, amides such as stearic acid amide and stearic acid ethanolamide, N-higher alkyl hydroxyalkyl carbamates such as N-dodecylhydroxyethyl carbamate, and the like.

It should be noted that in the present specification and claims, the terms printing ink and printing paste are used interchangeably and that all proportions are by weight unless otherwise set forth.

The foamed ink also preferably contains a binder resin. The binder resin may be any of the resins conventionally used in water based inks, e.g., melamine-formaldehyde resins, alkyd resins and butadiene acrylonitrile copolymers. Most preferably the binder resins are of the type that are soluble in dilute aqueous alkali solvents but insoluble in water once the ink is printed and dried. Such resins include shellac; proteins such as zein or casein; maleic anhydride-rosin adducts with high acid values such as unesterified maleic anhydride-rosin adducts having acid values of 250 to 280 and rosin modified phenol-formaldehydes among others.

The gas which is incorporated into the ink paste to produce the foamed ink may be any of the gases set forth in U.S. Patent No. 2,971,458 including air and other permanent gases such as nitrogen, carbon dioxide, oxygen or argon as well as such traditional aerosol gases as ethyl chloride, propane, butane and nitrous oxide. However, as will be set forth later in greater detail, best results are achieved when the gas incorporated in a liquefiable gas such as fluorinated hydrocarbons of the "Freon" and "Genetron" types which are fluoro-, chloro- and fluorochloroethanes.

While the gases may be initially foamed and then refoamed by methods including agitation such as whipping or by bubbling the gas into the ink, the foams are preferably produced by the aerosol method, that is a gas such as a chlorinated and/or fluorinated hydrocarbon which is liquefiable is used. Initially and after removal from the enclosed feeding device on each cycle, the gas is compressed to a pressure greater than the vapor pressure of the gas at the particular temperature which is usually room temperature whereby the gas liquefies. On the other hand, the pressure in the enclosed feeding device is less than the vapor pressure of the gas permitting the liquefied gas in the ink circulated to the feeding device to enter into the gaseous state creating a foam. Foaming and refoaming the ink in this manner produces a very homogeneous ink foam of small bubble size which produces excellent gravure printing.

We have found that conventionally compressible but non-liquefiable gases of the "aerosol" type such as carbon dioxide, nitrous oxide, nitrogen, propane and butane may also be used. Initially and after the withdrawal of the foam from the enclosed feeding device on each cycle the gas in the ink is kept under a pressure greater than that of the feeding device. Upon being recirculated to the feeding device, which is at a lower pressure, the gas expands resulting in a uniform foam.

Best results are achieved when the chlorinated and/or fluorinated hydrocarbon used is one having a vapor pressure of between 15 and 220 p.s.i.g. at 100° F. and most preferably between 30 and 120 p.s.i.g. (narrower range) at 100° F. Examples of such hydrocarbons are chlorofluoroethanes such as 1,2 - dichloro - 1,1,2,2 - tetrafluoroethane, 1,1-dichloro-1,2,2,2-tetrafluoroethane, 1-chloro-1,1-difluoroethane and dichloro-difluoromethane.

Furthermore, it has been found to be very advantageous to maintain the foamed ink in the enclosed feeding device at an elevated pressure, preferably at from 5 to 30 p.s.i.g. Of course, in the preferred embodiment where the ink is compressed during the refoaming cycle, the elevated pressure in the enclosed feed device must still be lower than the pressure to which the foamed ink is subjected to during compression. This elevated pressure drives the foamed ink out of the feeding device at a pressure which is sufficient to completely fill the cells of even the finest of gravure engravings.

The drawings which follow set forth a specific embodiment of apparatus used in carrying out this invention and should aid in the understanding of the invention.

Figure 2:
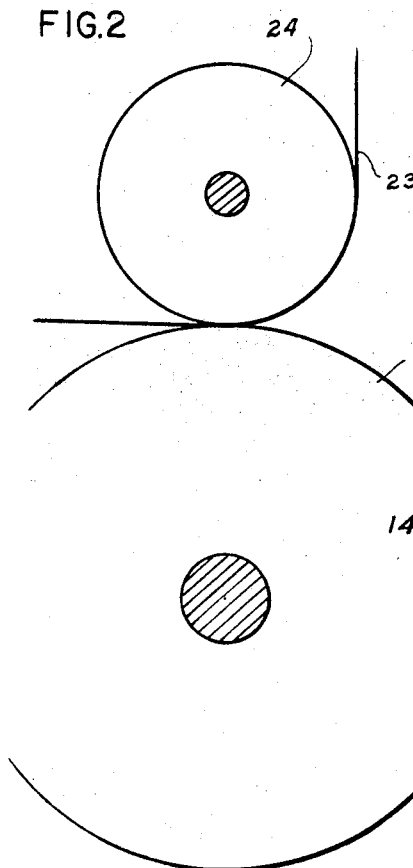
FIGURE 2 is a partial section of the apparatus of FIGURE 1 along line 2—2 of FIGURE 1.
Figure 1:
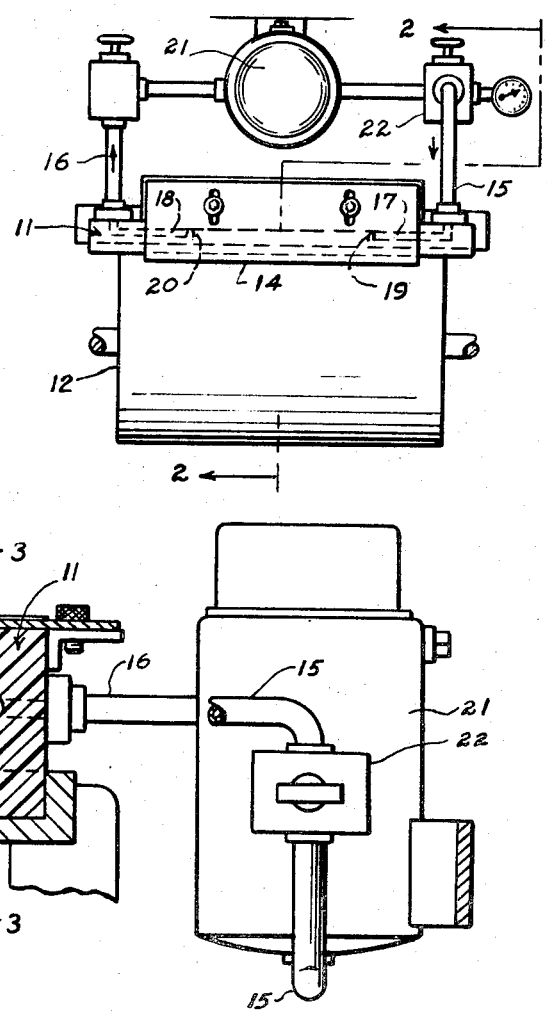
FIGURE 1 is a top view of an embodiment of the apparatus of this invention.
Figure 3:
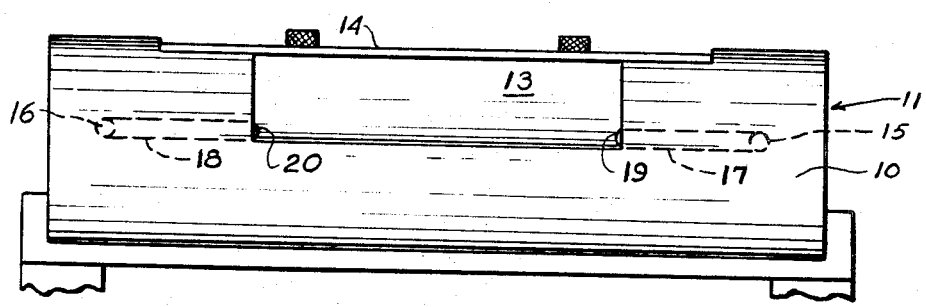
FIGURE 3 is a front view along line 3—3 of FIGURE 2 of the foamed ink feeder.

Since the art of gravure pringing is old and well understood, the details of conventional machinery used in our invention are not shown in the drawings; the details of printing machine frame, bearings, gears, speed controls, doctor-blade assembly, web-tensioning means, etc., are familiar to those well-versed in this art and need not be set forth here. Those familiar with the printing arts will readily understand that conventional equipment can be used with slight modifications in the practice of our invention, that such modifications are sufficiently set forth in this specification, and that the accompanying drawings represent one type of equipment suitable for the practice of our invention.

Concave surface 10 of foamed ink feeder 11 has the same radius of curvature as engraved cylinder 12 and is in flush contact with the cylinder to create a substantially air-tight seal for foam chamber 13, doctor blade 14 forming the upper periphery of the chamber. The ink is fed into the chamber 13 of the feeder via conduit 15 and withdrawn from the chamber via conduit 16. For best results a pressure preferably of from 5 to 30 p.s.i.g. is permitted to build up and is maintained in chamber 13. This is done by adjusting intake through conduit 15 with respect to the withdrawal through conduit 16. Intake and withdrawal conduits 15 and 16 are connected with chamber 13 through internal conduits 17 and 18 and openings 19 and 20 respectively. Withdrawal conduit 16 leads to compressor 21 and intake conduit 15 leads from compressor 21.

In a typical cycle, using an ink containing a liquefiable gas such as dichloro-tetrafluoroethane, ink from the compressor 21 under a pressure sufficient to maintain the gas in the liquid state is fed via intake conduit 15, through conduit 17 into chamber 13. As the ink passes through valve 22, the pressure on the ink drops to a pressure which while still above atmospheric is below the vapor pressure of the liquefied gas which then expands into the gaseous state resulting in a foam. The foamed ink continuously passes through the chamber where a small percentage is removed by rotating engraved cylinder 12. Most of the ink is withdrawn through conduits 18 and 16 and circulated to compressor 21 where the gas is again liquefied by the application of a pressure in excess of the vapor pressure of the gas, after which the ink is again recirculated to the ink feeder.

The ink picked up by the engraved gravure cylinder 12 is transferred to paper web 23 which passes between the engraved gravure cylinder and impression cylinder 24.

Preferably the rate of circulation to and from chamber 13 is such that the residence time of the ink in the chamber is from 0.01 second to 30 seconds and most preferably from 0.2 to 20 seconds.

Typical ink formulations which may be foamed in accordance with this invention are:

EXAMPLE 1

| | Weight percentage |
|---|---|
| Phthalocyanine blue pigment | 9.16 |
| Sodium lauryl sulfate (dispersing agent) | 2.74 |
| The pentaerythritol ester of fumarated rosin having a melting point of 302–347° F. and an acid number of 100–200 | 11.95 |
| 28% aqueous solution of ammonia | 2.58 |
| Stearic acid ethanolamide | 10.00 |
| Water | 63.57 |

EXAMPLE 2

| | Parts by weight |
|---|---|
| Barium lithol red pigment | 7.00 |
| Sodium lauryl sulfate (dispersing agent) | 4.30 |
| Pentaerythritol partial ester of maleated rosin having a melting point of about 155–165° and an acid number of 105–115 | 24.60 |
| 28% aqueous ammonia | 4.96 |
| Water | 89.26 |

When either of the above inks is to be foamed with a liquefiable gas, from 4 to 12% by weight of a liquefiable gas such as a mixture of 40% of dichloro-difluoromethane and 60% of dichloro-tetrafluoroethane is incorporated into the ink in the liquid form.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

We claim:

1. A process of intaglio printing which comprises applying a foamed print paste having a density between 0.1 and 0.9 gram/cm.³ to the engravings of an intaglio printing cylinder, said print paste being maintained for a residence time of from 0.01 to 30 seconds in an enclosed feeding device which excludes air from contact with the print paste in the vicinity of its contact with the engraved cylinder and said paste being continuously removed from the enclosed feeding device, refoamed and recirculated to said enclosed feeding device, wherein the removed foamed paste is refoamed by compressing the paste and maintaining the paste under increased pressure until the paste is recirculated into the enclosed feeding device whereupon the reduction in pressure results in foaming, and then contacting the printing cylinder engravings with the substrate to be printed upon to transfer the print paste from the engravings to the substrate.

2. The process of claim 1, wherein said foamed print paste contains an aliphatic chlorofluorocarbon gas having a vapor pressure between 15 and 100 p.s.i.g. at 100° F. and said paste is subjected to a pressure greater than the vapor pressure of said gas after the removal of the paste from the enclosed feeding device to condense the gas into the liquid form.

3. The process of claim 1 wherein the foamed paste in the enclosed feeding device is maintained at an elevated pressure of from 5 to 30 p.s.i.g.

4. The process of claim 1, wherein the foamed paste in the enclosed feeding device is maintained at an elevated pressure of from 5 to 30 p.s.i.g. but below the pressure at which the compressed paste is maintained.

5. The process of claim 3 wherein the foamed paste in the enclosed feeding device is maintained at an elevated pressure of 5 to 30 p.s.i.g. but less than the vapor pressure of the aliphatic chlorofluorocarbon gas.

References Cited

UNITED STATES PATENTS

| 1,731,710 | 10/1929 | Davenport et al. | 62—115 |
| 2,018,193 | 10/1935 | Smith | 101—366 |
| 2,151,969 | 3/1939 | Henderson | 101—366 |
| 2,177,656 | 10/1939 | Kaddeland | 101—366 |
| 2,201,008 | 5/1940 | MacArthur | 101—366 |
| 2,971,458 | 2/1961 | Kumins et al. | 101—170 |
| 3,037,887 | 6/1962 | Brenner | 134—102 |
| 3,047,418 | 7/1962 | Compton | 118—324 |
| 3,212,916 | 10/1965 | Metcalf et al. | 118—602 |

ROBERT E. PULFREY, *Primary Examiner.*

J. R. FISHER, *Assistant Examiner.*